(12) United States Patent
Chaudhry et al.

(10) Patent No.: US 7,051,192 B2
(45) Date of Patent: May 23, 2006

(54) FACILITATING VALUE PREDICTION TO SUPPORT SPECULATIVE PROGRAM EXECUTION

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 638 days.

(21) Appl. No.: 09/761,217

(22) Filed: Jan. 16, 2001

(65) Prior Publication Data

US 2003/0079116 A1    Apr. 24, 2003

Related U.S. Application Data

(60) Provisional application No. 60/208,429, filed on May 31, 2000.

(51) Int. Cl.
*G06F 9/46* (2006.01)
(52) U.S. Cl. ...................................................... 712/218
(58) Field of Classification Search ................ 712/218, 712/235
See application file for complete search history.

(56) References Cited

U.S. PATENT DOCUMENTS

| | | | | |
|---|---|---|---|---|
| 4,760,520 A | | 7/1988 | Shintani et al. ............. | 364/200 |
| 5,737,750 A | * | 4/1998 | Kumar et al. ............... | 711/129 |
| 5,850,543 A | * | 12/1998 | Shiell et al. ................ | 712/238 |
| 5,919,256 A | | 7/1999 | Widigen et al. ............ | 712/218 |
| 5,996,060 A | | 11/1999 | Mendelson et al. ......... | 712/205 |
| 6,065,115 A | * | 5/2000 | Sharangpani et al. ....... | 712/235 |
| 6,574,725 B1 | * | 6/2003 | Kranich et al. ............. | 712/31 |

OTHER PUBLICATIONS

Pedro Marcuello, Antonio Gonzalez and Jordi Tubella, Speculative Multithreaded Processors, 1998, Proceedings of the 12th International Conference of Supercomputing.*
Pedro Marcuello and Antonio Gonzalez, Clustered Speculative Multithreaded Processors, 1999, Proceedings of the 13th International Conference on Supercomputing.*
Pedro Marcuello and Antonio Gonzalez, Data Speculative Multithreaded Architecture, Aug. 1998, Proceedings of the 24th Euromicro Conference.*

(Continued)

*Primary Examiner*—Eddie Chan
*Assistant Examiner*—Aimee J. Li
(74) *Attorney, Agent, or Firm*—Park, Vaughan & Fleming LLP

(57) ABSTRACT

One embodiment of the present invention provides a system that predicts a result produced by a section of code in order to support speculative program execution. The system begins by executing the section of code using a head thread in order to produce a result. Before the head thread produces the result, the system generates a predicted result to be used in place of the result. Next, the system allows a speculative thread to use the predicted result in speculatively executing subsequent code that follows the section of code. After the head thread finishes executing the section of code, the system determines if a difference between the predicted result and the result generated by the head thread has affected execution of the speculative thread. If so, the system executes the subsequent code again using the result generated by the head thread. If not, the system performs a join operation to merge state associated with the speculative thread with state associated with the head thread. In one embodiment of the present invention, executing the subsequent code again involves performing a rollback operation for the speculative thread to undo actions performed by the speculative thread.

17 Claims, 7 Drawing Sheets

OTHER PUBLICATIONS

Patterson et al., Computer Organization & Design: The Hardware/Software Interface, 1998, Morgan Kaufmann Publishers, Inc., pp. 712-713 and 717-718.*

Tamir, Yuval. "Self-Checking Self-Repairing Computer Nodes Using the Mirror Processor". IEEE Journal of Solid-State Circuits vol. 27, No. 1, Jan. 1992. © 1992 IEEE. pp. 4-16.*

Raghavengra, Vijay and Lursinsap, Chidchanok. "A Technique for Micro-Rollback Self-Recovery Synthesis". IEEE Transactions on Computer-Aided Design of Integrated Circuits and Systems, vol. 14, No. 9, Sep. 1995, © 1995 IEEE. pp. 1171-1179.*

Publication, entitled "Value Prediction for Speculative Multithreaded Architectures," by Pedro Marcuello et al., Universitat Politecnica de Catalunya, Proceedings of the 32$^{nd}$ Annual ACM/IEEE International Synposium on Microarchitecture, Israel, Nov. 16-18, 1999, pp. 230-236.

Publication, entitled "Available Parallelism with Data Value Prediction," by Rahul Sathe and Manoj Franklin., Proceedings of International Conference on High Performance Computing, Dec. 17, 1998, XP001001139, pp. 194-201.

* cited by examiner

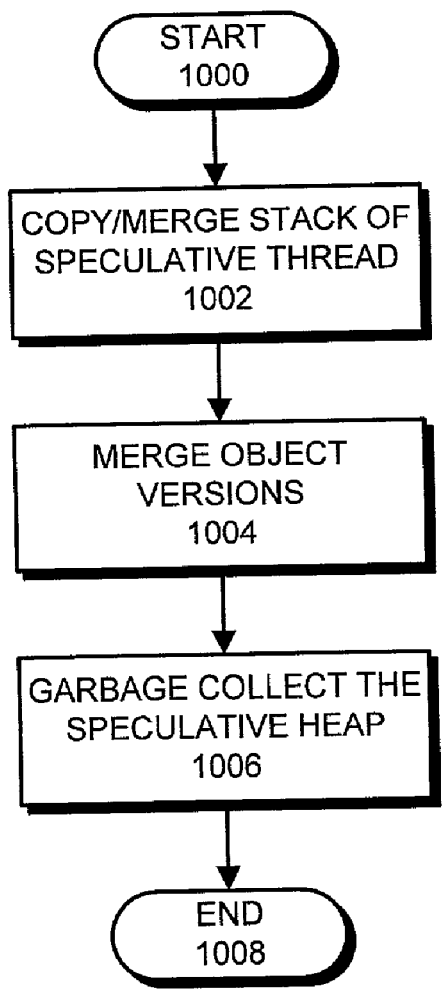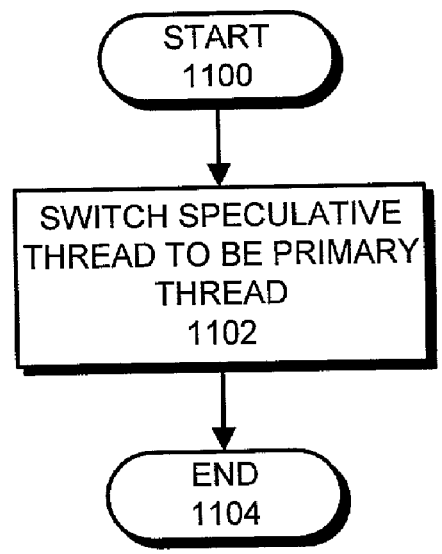
FIG. 10                FIG. 11

```
METHOD A() {
    •
    •
    •
    RESULT = B();
    •
    •
    USE RESULT
    •
    •
    •
}
```
FIG. 12A
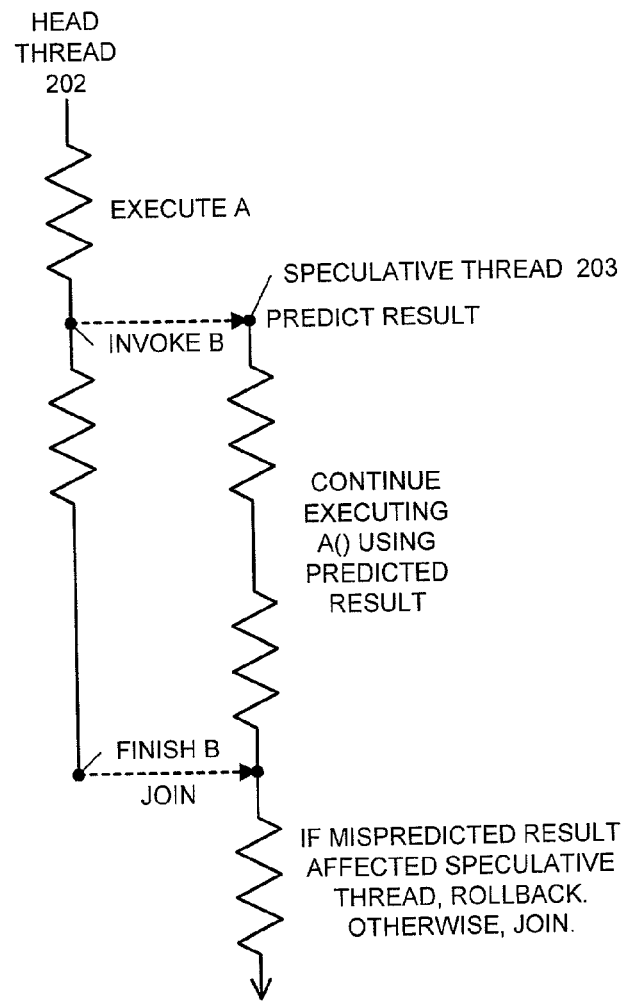
FIG. 12B
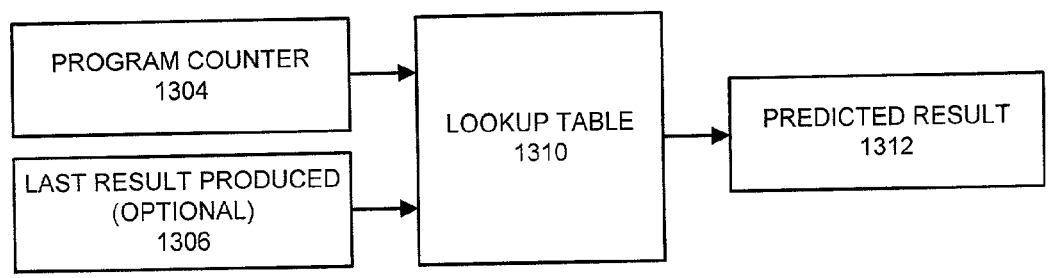
FIG. 13

FACILITATING VALUE PREDICTION TO SUPPORT SPECULATIVE PROGRAM EXECUTION

RELATED APPLICATION

This application hereby claims priority under 35 U.S.C. § 119 to U.S. Provisional Patent Application No. 60/208,429 filed May 31, 2000.

BACKGROUND

1. Field of the Invention

The present invention relates to compilers and techniques for improving computer system performance. More specifically, the present invention relates to a method and apparatus that facilitates method-level and/or loop-level value prediction in order to support speculative execution during space and time dimensional execution of a computer program.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One problem with speculative execution is that data dependencies can often limit the amount of speculative execution that is possible. For example, if a method returns a value that is used in subsequent computational operations, the value must be returned before the subsequent computational operations can proceed. Hence, the system cannot speculatively execute the subsequent computational operations until the method returns.

However, return values for methods and other collections of instructions are often predictable. For example, a method very frequently returns the same value or a predictable value during successive invocations of the method. Furthermore, even if a method return value is not predicted correctly, the method return value may not be used by subsequent program instructions. Hence, it may be possible to improve computer system performance by predicting a value produced by a section of program code in order to allow speculative execution to proceed.

Hence, what is needed is a method and an apparatus that facilitates predicting values generated by a section of program code in order to facilitate speculative program execution.

Note that people have suggested performing value prediction for a single computer instruction with long or unpredictable latency, such as a load operation or a square root operation. However, a predicted value generated for a single instruction cannot be used to facilitate performing speculative execution of program instructions at a higher level of granularity, for example predicting the outcome of a function.

SUMMARY

One embodiment of the present invention provides a system that predicts a result produced by a section of code in order to support speculative program execution. The system begins by executing the section of code using a head thread in order to produce a result. Before the head thread produces the result, the system generates a predicted result to be used in place of the result. Next, the system allows a speculative thread to use the predicted result in speculatively executing subsequent code that follows the section of code. After the head thread finishes executing the section of code, the system determines if a difference between the predicted result and the result generated by the head thread has affected execution of the speculative thread. If so, the system executes the subsequent code again using the result generated by the head thread. If not, the system performs a join operation to merge state associated with the speculative thread with state associated with the head thread.

In one embodiment of the present invention, executing the subsequent code again involves performing a rollback operation for the speculative thread to undo actions performed by the speculative thread.

In one embodiment of the present invention, determining if the difference affected execution of the speculative thread involves determining if the speculative thread accessed the predicted result.

In one embodiment of the present invention, determining if the difference affected execution of the speculative thread involves determining if the predicted result differs from the result generated by the head thread.

In one embodiment of the present invention, generating the predicted result involves looking up a value based upon a program counter for the program. In a variation on this embodiment, generating the predicted result involves additionally looking up the value based upon at least one previously generated value for the result. In a variation on this embodiment, generating the predicted result involves performing a function on the value.

In one embodiment of the present invention, executing the section of code involves performing a method invocation, a function call or a procedure call to execute the section of code.

In one embodiment of the present invention, the section of code is a body of a loop in the program, and the result is a loop carried dependency.

In one embodiment of the present invention, during a write operation to a memory element by the head thread, the system performs the write operation to a primary version of the memory element and checks status information associated with the memory element to determine if the memory element has been read by the speculative thread. If the memory element has been read by the speculative thread, the system causes the speculative thread to roll back so that the speculative thread can read a result of the write operation. If the memory element has not been read by the speculative thread, the system performs the write operation to a space-time dimensioned version of the memory element if the space-time dimensioned version exists. In a variation on this embodiment, performing the join operation involves merging the space-time dimensioned version of the memory element into the primary version of the memory element and discarding the space-time dimensioned version of the memory element.

BRIEF DESCRIPTION OF THE FIGURES

FIG. 10 is a flow chart illustrating operations involved in performing a join between a head thread and a speculative thread in accordance with an embodiment of the present invention.

FIG. 11 is a flow chart illustrating operations involved in performing a join between a head thread and a speculative thread in accordance with another embodiment of the present invention.

FIG. 12A illustrates an exemplary section of program code in accordance with an embodiment of the present invention.

FIG. 12B illustrates how a speculative thread uses a predicted result of a method to facilitate execution of a speculative thread in accordance with an embodiment of the present invention.

FIG. 13 illustrates how the predicted result can be obtained from a lookup table in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDS (digital video discs), and computer instruction signals embodied in a carrier wave. For example, the carrier wave may carry information across a communications network, such as the Internet.

Computer System

Figure 1:
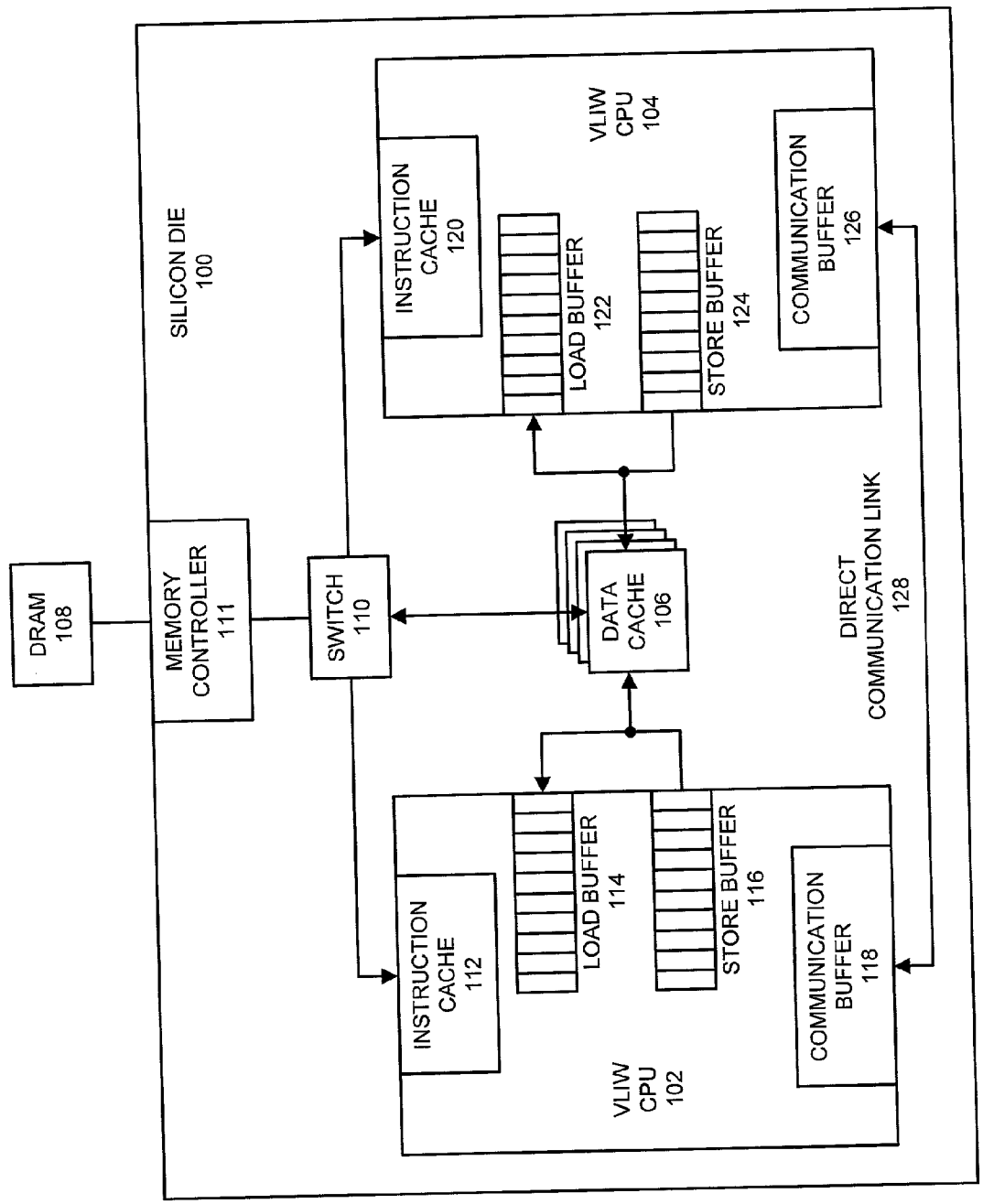
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16 K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
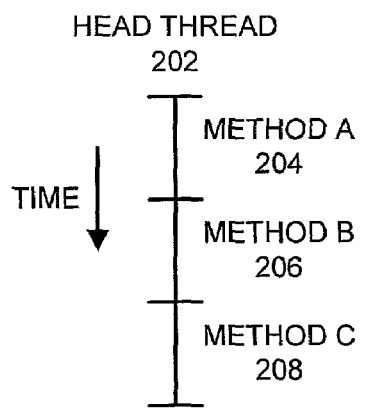
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
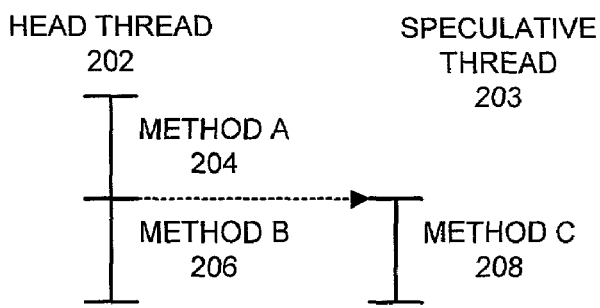
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
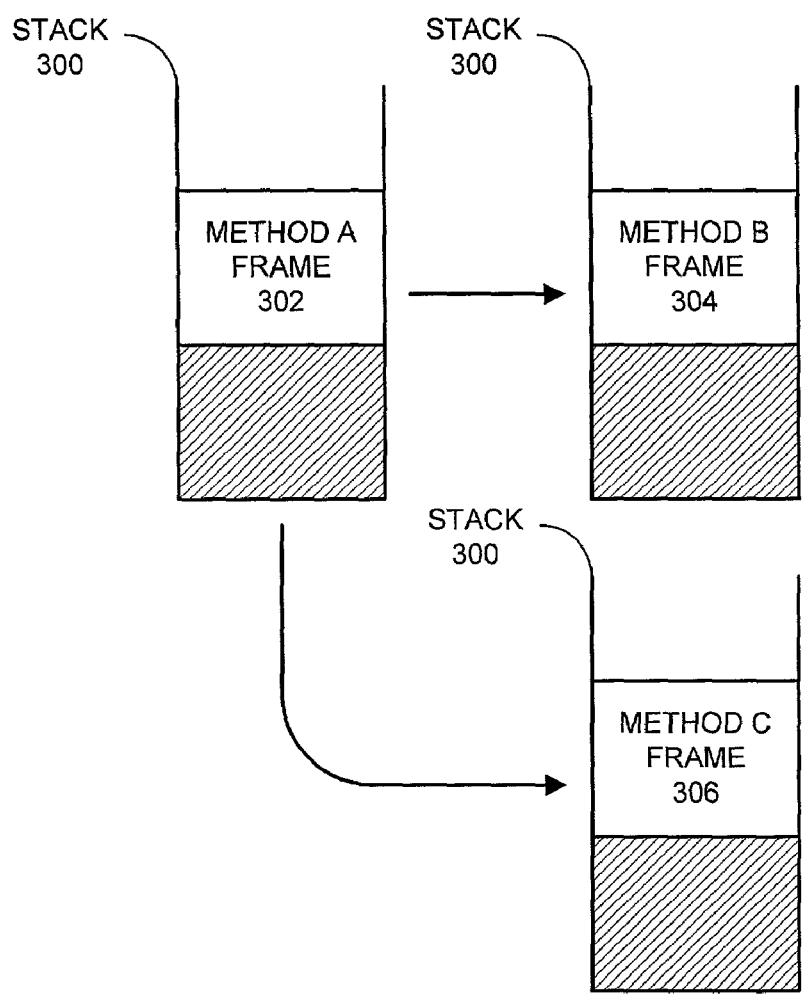
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java byte code into machine code for the specific computing platform. Alternatively, a Java byte code can be executed directly on a Java byte code engine running on the specific computing platform.

Fortunately, a Java byte code contains more syntactic information than conventional machine code. In particular, the Java byte codes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
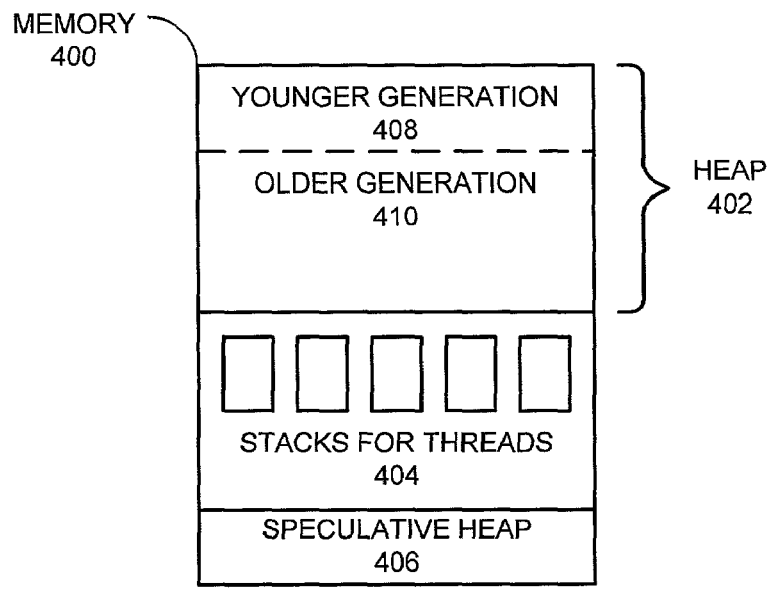
FIG. 4 illustrates how memory is partitioned between stack and heap in accordance with an embodiment of the present invention.
Figure 5:
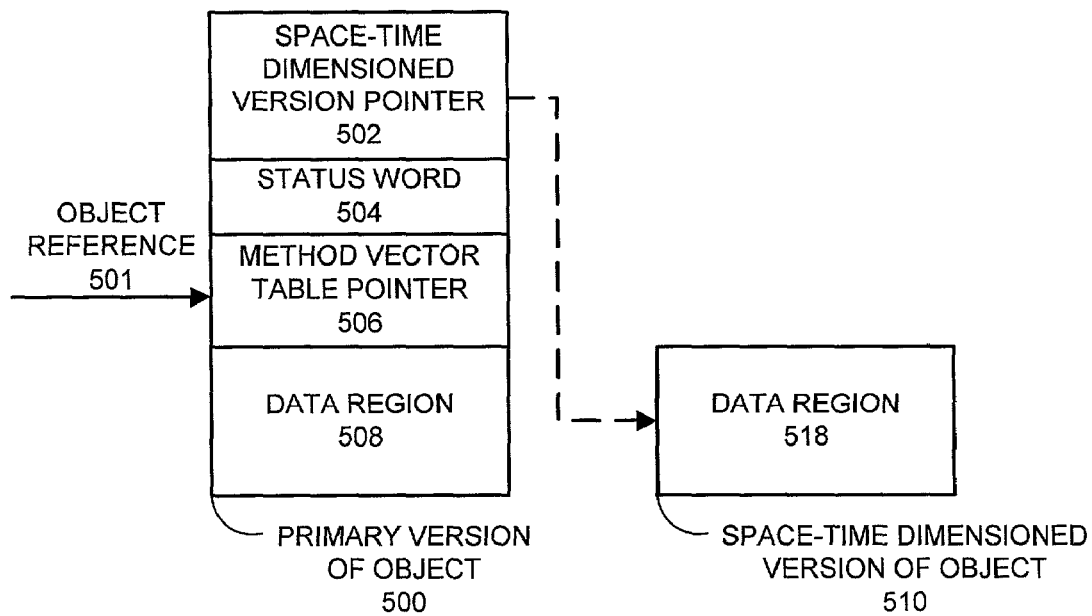
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
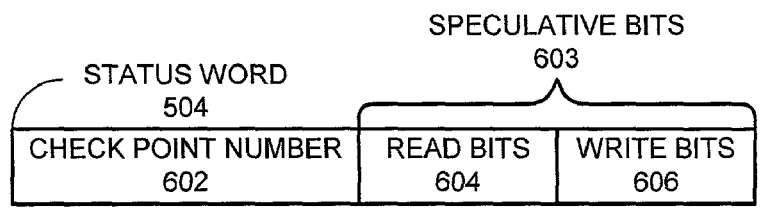
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

Figure 7:
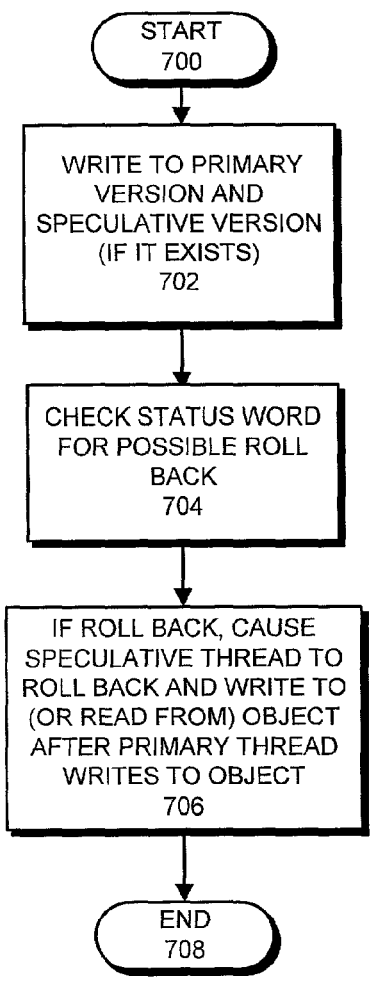
FIG. 7 is a flow chart illustrating operations involved in performing a write to a memory element by a head thread in accordance with an embodiment of the present invention.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

Figure 8:
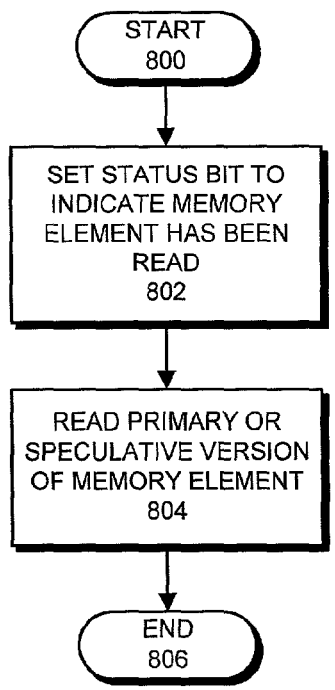
FIG. 8 is a flow chart illustrating operations involved in performing a read to a memory element by a speculative thread in accordance with an embodiment of the present invention.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802).

Speculative thread 203 then reads space-time dimensioned version 510, if it exists. Otherwise, speculative thread 203 reads primary version 500.

Figure 9:
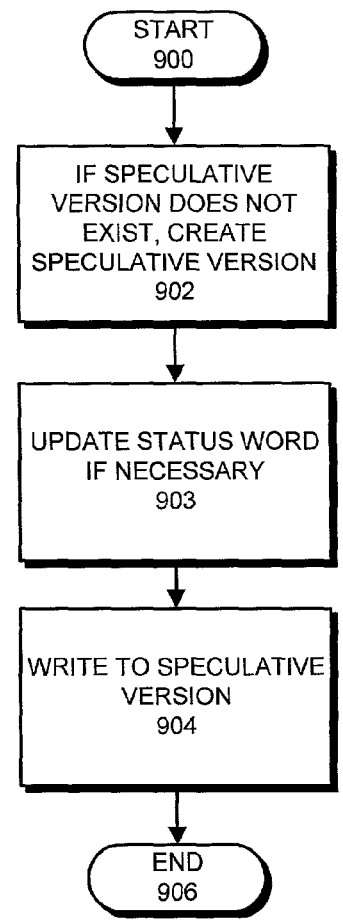
FIG. 9 is a flow chart illustrating operations involved in performing a write to a memory element by a speculative thread in accordance with an embodiment of the present invention.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

FIG. 11 is a flow chart illustrating operations involved in ajoin operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Value Prediction to Support Speculative Execution

FIG. 12A illustrates an exemplary section of program code in accordance with an embodiment of the present invention. This exemplary section of program code includes a method A( ), which contains code that invokes a method B( ) in order to return a result. This result is used in executing subsequent code within method A( ).

FIG. 12B illustrates how speculative thread 203 uses a predicted result 1312 of method B( ) to facilitate execution of speculative thread 203 in accordance with an embodiment of the present invention. As illustrated in FIG. 12B, head thread 202 begins executing method A( ). At some point during this execution, head thread 202 begins executing method B( ) in order to generate a result. At this point, speculative thread 203 predicts the result of the method B( ) and continues executing method A( ) at a point in the program after the return from method B( ). Note that head thread 202 is still executing method B( ).

When head thread 202 eventually finishes executing method B( ), it attempts to perform a join operation with speculative thread 203. At this point, the system determines whether or not a mispredicted result of method B( ) affected the execution of speculative thread 203. If so, the system causes speculative thread 203 to perform a rollback operation. Otherwise, the system allows speculative thread 203 to join with head thread 202. The above-described process for using a predicted result 1312 to facilitate speculative execution is described in more detail below with reference to FIG. 14.

Note that although the present invention is described in the context of predicted a value returned by a method. The present invention can generally be used in predicting a value produced by any section of code. For example, in another embodiment of the present invention, the system predicts a loop carried dependency generated within the body of a program loop. Note that a loop carried dependency can include a variable that is updated within every iteration of a program loop.

FIG. 13 illustrates how the predicted result 1312 can be obtained from a lookup table 1310 in accordance with an embodiment of the present invention. In this embodiment, the system uses a lookup table 1310 to lookup predicted result 1312. Lookup table 1310 is indexed with a program counter 1304 (and is optionally indexed with a last result produced 1306) to retrieve predicted result 1312.

In one embodiment of the present invention, program counter 1304 contains the address from which method B( ) was invoked. In another embodiment, program counter 1304 contains the address at which the code that implements method B( ) is located. Note that lookup table 1310 may simply contain the last value returned by method B( ). However, in general, any predicted result can be stored within lookup table 1310.

Figure 14:
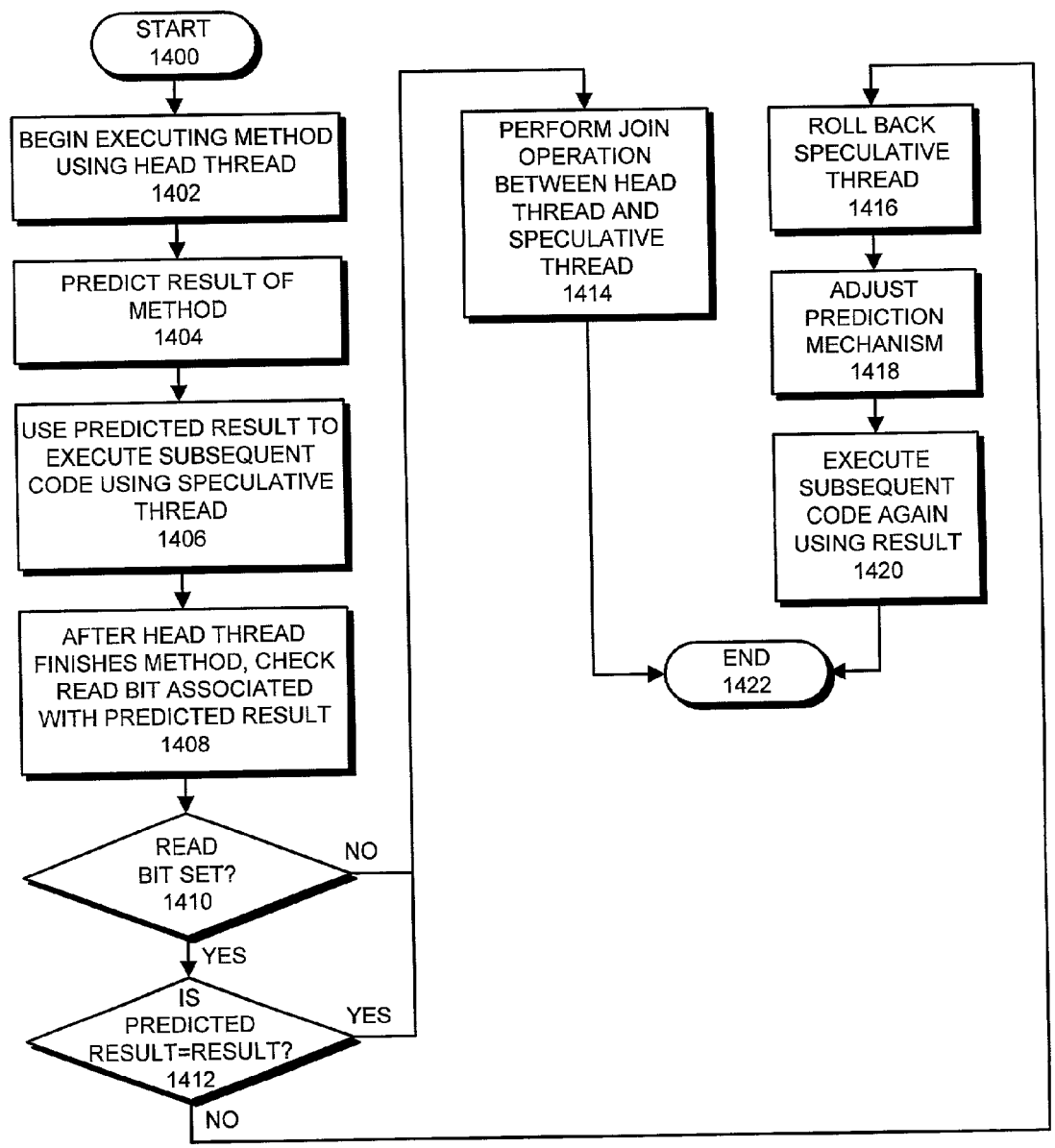
FIG. 14 is a flow chart illustrating the process of using a predicted result to facilitate speculative execution of a program in accordance with an embodiment of the present invention.

FIG. 14 is a flow chart illustrating the process of using a predicted result 1312 of a method to facilitate speculative execution of a program in accordance with an embodiment of the present invention. The system begins by executing a section of code (such as method B( ) from FIG. 12A) using head thread 202 (step 1402). Next, the system predicts the result returned by method B( ) (step 1404).

As mentioned above, any method for predicting the result of returned by a method can be used with the present invention. For example, the predicted result 1312 can be the last value returned by the method or that last value returned by the method when invoked from the same address. Alternatively, the predicted result 1312 can be a function of the last value returned by the method, such as the last value plus a constant. The predicted result 1312 can also be fixed default value.

Next, the predicted result is used to execute subsequent code following the invocation of method B( ) using speculative thread 203 (step 1406). At this point, head thread 202 has not finished executing method B( ).

After head thread 202 finishes executing method B( ), the system determines whether a read bit associated with predicted result 1312 has been set (step 1408). If not, speculative thread 203 has not read predicted result 1312. Hence, predicted result 1312 cannot have affected the execution of speculative thread 203. Hence, the system allows ajoin operation to proceed between head thread 202 and speculative thread 203 (step 1414).

Note that every time speculative thread 203 reads a return value for a method, speculative thread 203 marks a corresponding read bit to indicate that the return value has been read. This marking occurs in spite of the fact that the return value is located within a stack, and is not located within a heap.

If the read bit has been set, the system determines whether the result returned by method B( ) matches the predicted result (step 1412). If so, the system also allows a join operation to proceed between head thread 202 and speculative thread 203 (step 1414).

If the result returned by method B( ) does not match the predicted result 1312, the result was mispredicted. Furthermore, recall that speculative thread 203 has read the mispredicted result. Hence, it is very likely that speculative thread 203 has generated erroneous results. In this case, the system causes speculative thread 203 to roll back to undo any results generated by speculative thread 203 (step 1416). The system may additionally adjust the prediction mechanism based upon the result returned by head thread 292 (step 1418). Finally, the system again executes the subsequent code following method B( ) based upon the result returned by method B( ) instead of the erroneous predicted result 1312 (step 1420).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method that predicts a result produced by a section of code in order to support speculative program execution, the section of code including a plurality of program instructions, the method comprising:
    executing the section of code within a program using a head thread, wherein executing the section of code produces the result;
    before the head thread produces the result, generating a predicted result to be used in place of the result;
    using a speculative thread to speculatively execute subsequent code within the program using the predicted result, wherein the subsequent code follows the section of code in an execution stream of the program; and
    after the head thread finishes executing the section of code,
        checking a read bit, wherein the read bit indicates whether a field within a data region associated with the section of code has been read by the speculative thread, and, if so
            advancing the current time in the time dimension of the system, and
            determining if a difference between the predicted result and the result generated by the head thread affected execution of the speculative thread;
    if the difference affected execution of the speculative thread, performing a rollback operation for the speculative thread to undo actions performed by the speculative thread; and
    if the difference did not affect execution of the speculative thread, performing a join operation to merge state associated with the speculative thread with state associated with the head thread.

2. The method of claim 1, wherein determining if the difference affected execution of the speculative thread involves determining if the speculative thread accessed the predicted result.

3. The method of claim 1, wherein determining if the difference affected execution of the speculative thread involves determining if the predicted result differs from the result generated by the head thread.

4. The method of claim 1, wherein generating the predicted result involves looking up a value based upon a program counter for the program.

5. The method of claim 4, wherein generating the predicted result involves additionally looking up the value based upon at least one previously generated value for the result.

6. The method of claim 4, wherein generating the predicted result involves performing a function on the value.

7. The method of claim 1, wherein executing the section of code involves performing one of:
    a method invocation to execute the section of code;
    a function call to execute the section of code; and
    a procedure call to execute the section of code.

8. The method of claim 1, wherein the section of code is a body of a loop in the program, and the result is a loop carried dependency for the loop.

9. An apparatus that facilitates predicting a result produced by a section of code in order to support speculative program execution, the section of code including a plurality of program instructions, the apparatus comprising:
    A processor and a memory;
    A head thread that is configured to execute the section of code within a program, wherein executing the section of code produces the result;
    A prediction mechanism that is configured to generate a predicted result to be used in place of the result before the head thread produces the result;
    A speculative thread that is configured to speculatively execute subsequent code within the program using the predicted result, wherein the subsequent code follows the section of code in an execution stream of the program;
    A determination mechanism that is configured to determine if a difference between the predicted result and the result generated by the head thread affected execution of the speculative thread;
    A checking mechanism that is configured to check a read bit, wherein the read bit indicates whether a field within a data region associated with the section of code has been read by the speculative thread; and if so using
        A time advancing mechanism that is configured to advance the current time in the time dimension of the system, and
        A determining mechanism configured to determine if a difference between the predicted result and the result generated by the head thread affected execution of the speculative thread;
    A joining mechanism that is configured to merge state associated with the speculative thread with state associated with the head thread if the difference did not affect execution of the speculative thread; and
    Wherein if the difference affected execution of the speculative thread, the apparatus is configured to perform a rollback operation for the speculative thread to undo actions performed by the speculative thread.

10. The apparatus of claim 9, wherein the determination mechanism is configured to determine if the speculative thread accessed the predicted result.

11. The apparatus of claim 9, wherein the determination mechanism is configured to determine if the predicted result differs from the result generated by the head thread.

12. The apparatus of claim 9, wherein the prediction mechanism is configured to generate the predicted result by looking up a value based upon a program counter for the program.

13. The apparatus of claim 12, wherein the prediction mechanism is configured to generate the predicted result by additionally looking up the value based upon at least one previously generated value for the result.

14. The apparatus of claim 12, wherein the prediction mechanism is configured to generate the predicted result by performing a function on the value.

15. The apparatus of claim 9, wherein the section of code includes one of, a method, a function and a procedure.

16. The apparatus of claim 9, wherein the section of code is a body of a loop in the program, and the result is a loop carried dependency for the loop.

17. A computer-readable storage medium storing instructions that when executed by a computer cause the computer to perform a method that predicts a result produced by a section of code in order to support. speculative program execution, the section of code including a plurality of program instructions, the method comprising:

executing the section of code within a program using a head thread, wherein executing the section of code produces the result;

before the head thread produces the result, generating a predicted result to be used in place of the result;

using a speculative thread to speculatively execute subsequent code within the program using the predicted result, wherein the subsequent code follows the section of code in an execution stream of the program; and after the head thread finishes executing the section of code, checking a read bit, wherein the read bit indicates whether a field within a data region associated with the section of code has been read by the speculative thread, and, if so advancing the current time in the time dimension of the system, and determining if a difference between the predicted result and the result generated by the head thread affected execution of the speculative thread;

if the difference affected execution of the speculative thread, performing a rollback operation for the speculative thread to undo actions performed by the speculative thread; and if the difference did not affect execution of the speculative thread, performing a join operation to merge state associated with the speculative thread with state associated with the head thread.

* * * * *